(12) United States Patent
Sartor

(10) Patent No.: US 7,876,975 B2
(45) Date of Patent: Jan. 25, 2011

(54) METHOD FOR DERIVING NOISE STATISTICAL PROPERTIES OF A SIGNAL

(75) Inventor: Piergiorgio Sartor, Fellbach (DE)

(73) Assignee: Sony Deutschland GmbH, Berlin (DE)

( * ) Notice: Subject to any disclaimer, the term of this patent is extended or adjusted under 35 U.S.C. 154(b) by 1002 days.

(21) Appl. No.: 11/680,128

(22) Filed: Feb. 28, 2007

(65) Prior Publication Data

US 2007/0237215 A1    Oct. 11, 2007

(30) Foreign Application Priority Data

Mar. 29, 2006    (EP)    .................................. 06006611

(51) Int. Cl.
 *G06T 5/00*    (2006.01)
(52) U.S. Cl. ..................................... 382/275
(58) Field of Classification Search ........................ None
See application file for complete search history.

(56) References Cited

U.S. PATENT DOCUMENTS 5,521,851 A * 5/1996 Wei et al. ..................... 702/195

6,707,950 B1    3/2004    Burns et al.
2002/0034337 A1    3/2002    Shekter
2002/0126910 A1*    9/2002    Gindele et al. .............. 382/254
2003/0002744 A1    1/2003    Lopez-Estrada et al.

OTHER PUBLICATIONS

Jinyi Qi, et al., "Resolution and Noise Properties of MAP Reconstruction for Fully 3-D PET", IEEE Transactions on Medical Imaging, vol. 19, No. 5, May 2000, pp. 493-506.

* cited by examiner

*Primary Examiner*—Brian P Werner
(74) *Attorney, Agent, or Firm*—Oblon, Spivak, McClelland, Maier & Neustadt, L.L.P.

(57) ABSTRACT

The invention relates to a method for deriving noise statistical properties (NSP) for a signal (S) wherein first distorted noise statistical properties (DNSP) are derived from a distorted signal (DS). In addition the distorted noise statistical properties (DNSP) are subjected to a deconvolution/inversion process (S3) to thereby derive un-distorted noise statistical properties (NSP) for said underlying un-distorted signal (S).

16 Claims, 19 Drawing Sheets

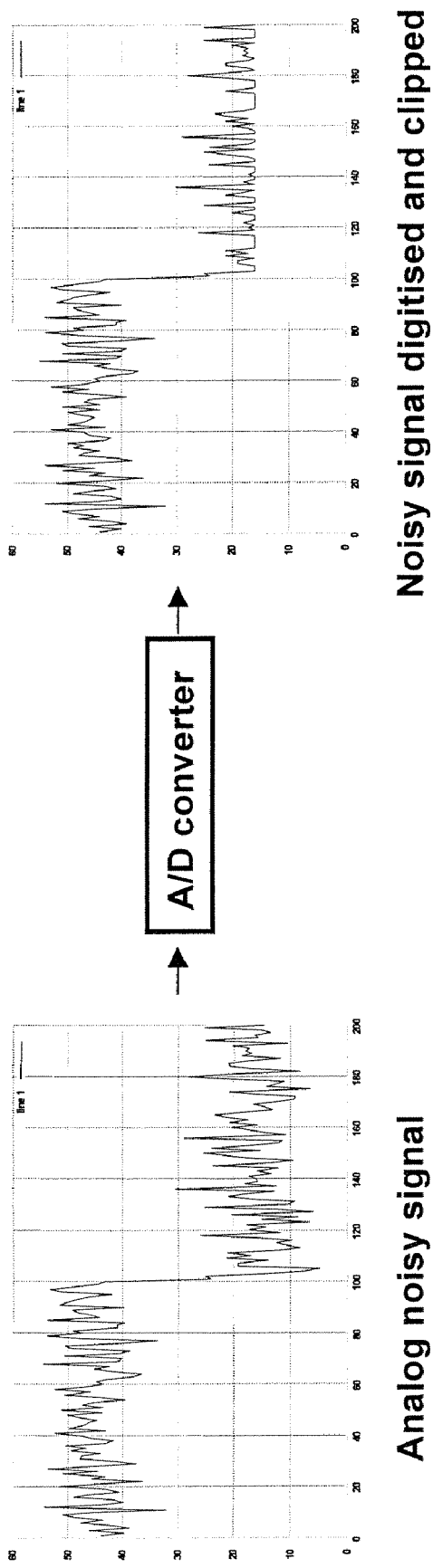
Fig. 1 - Origin of Saturated Areas

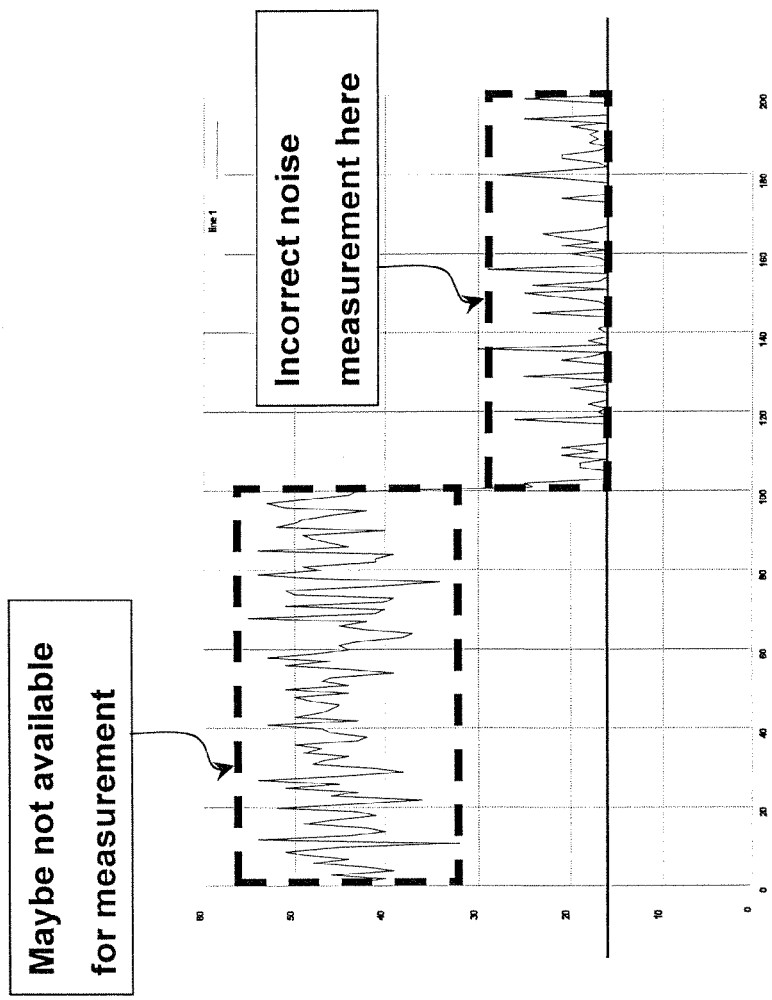
Fig. 2 – Problem of Saturated Areas

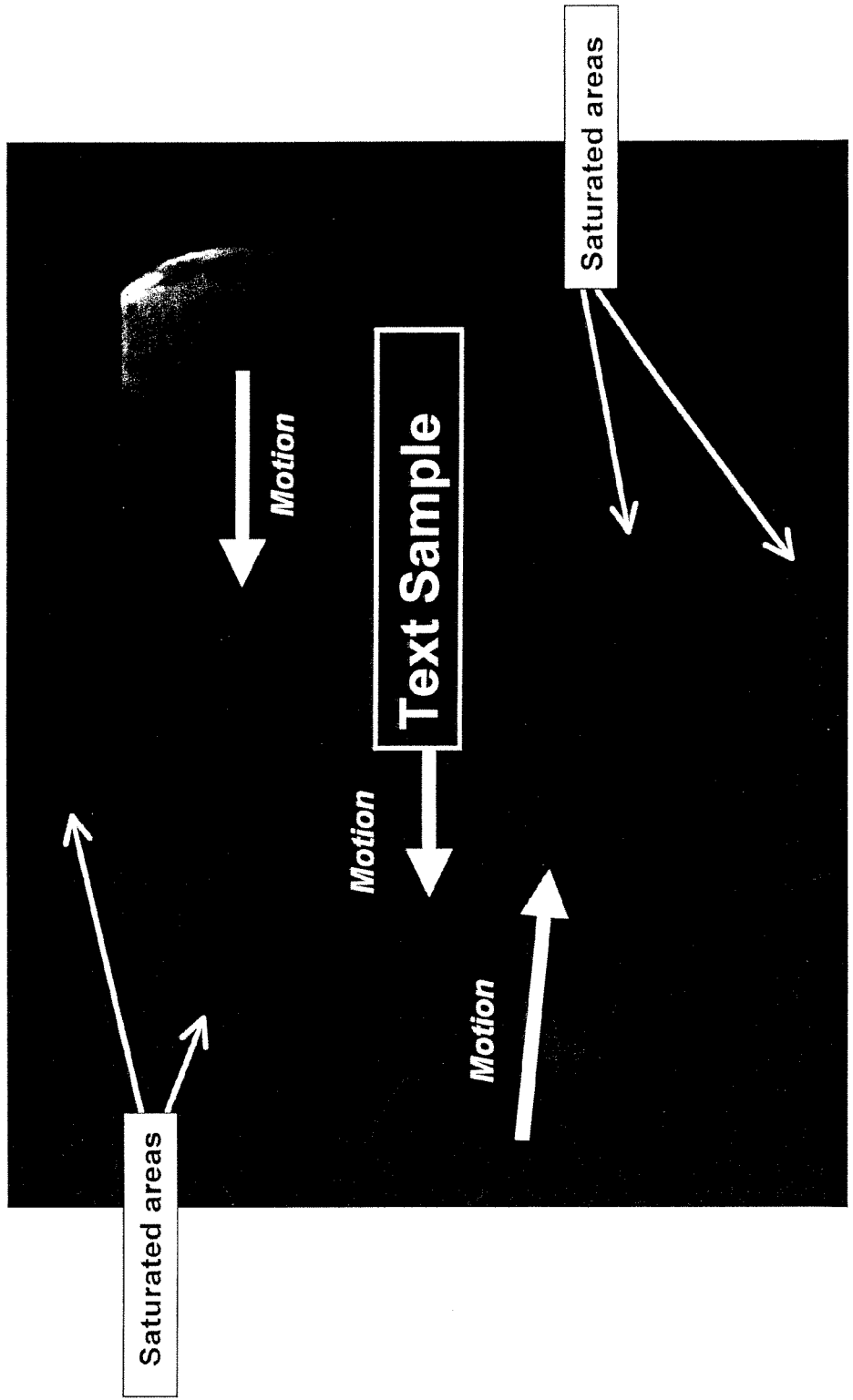
Fig. 3 – Examples of Saturated Areas

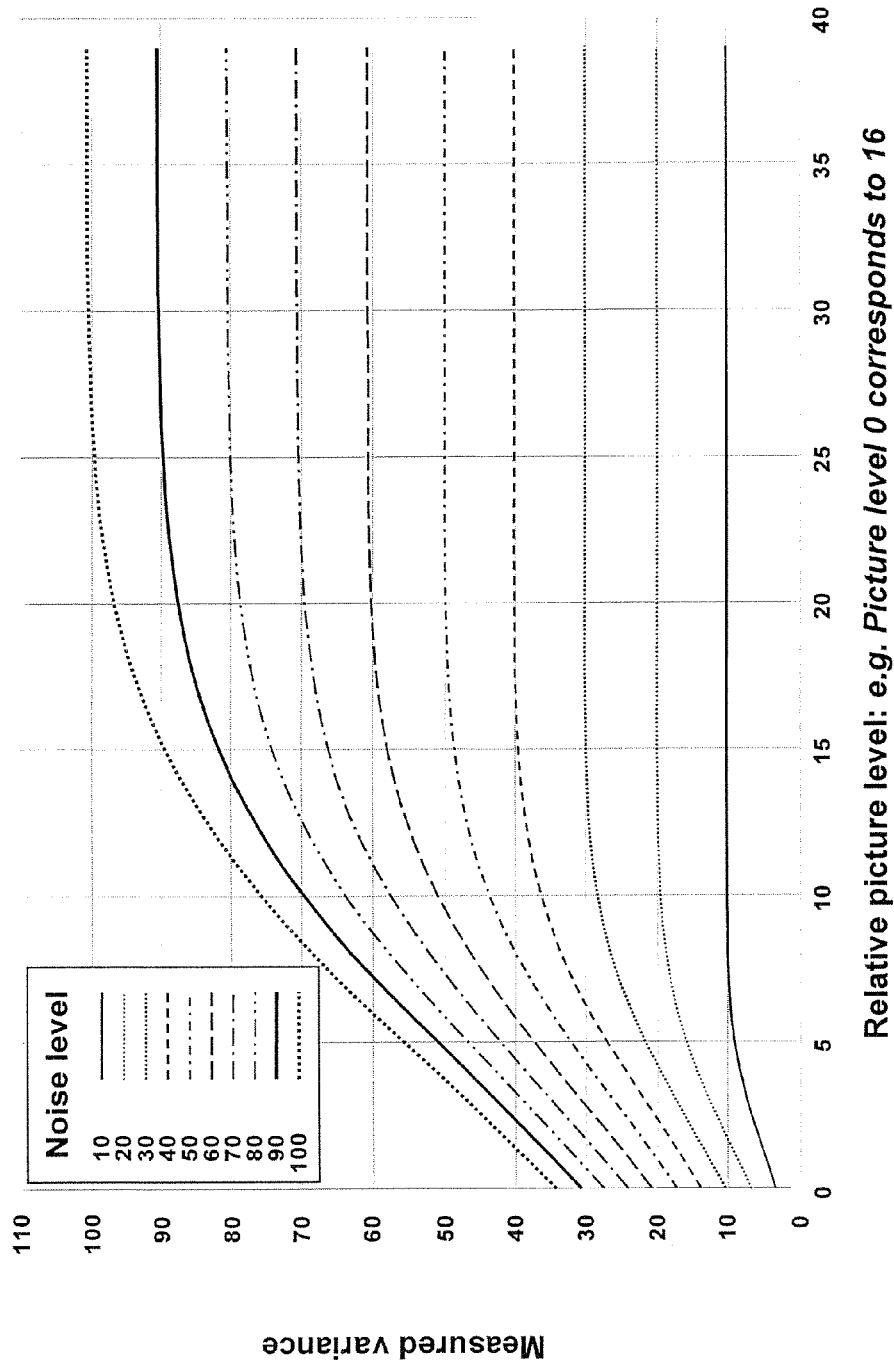
Fig. 4 – Measured Variance Attenuation for Saturated Areas

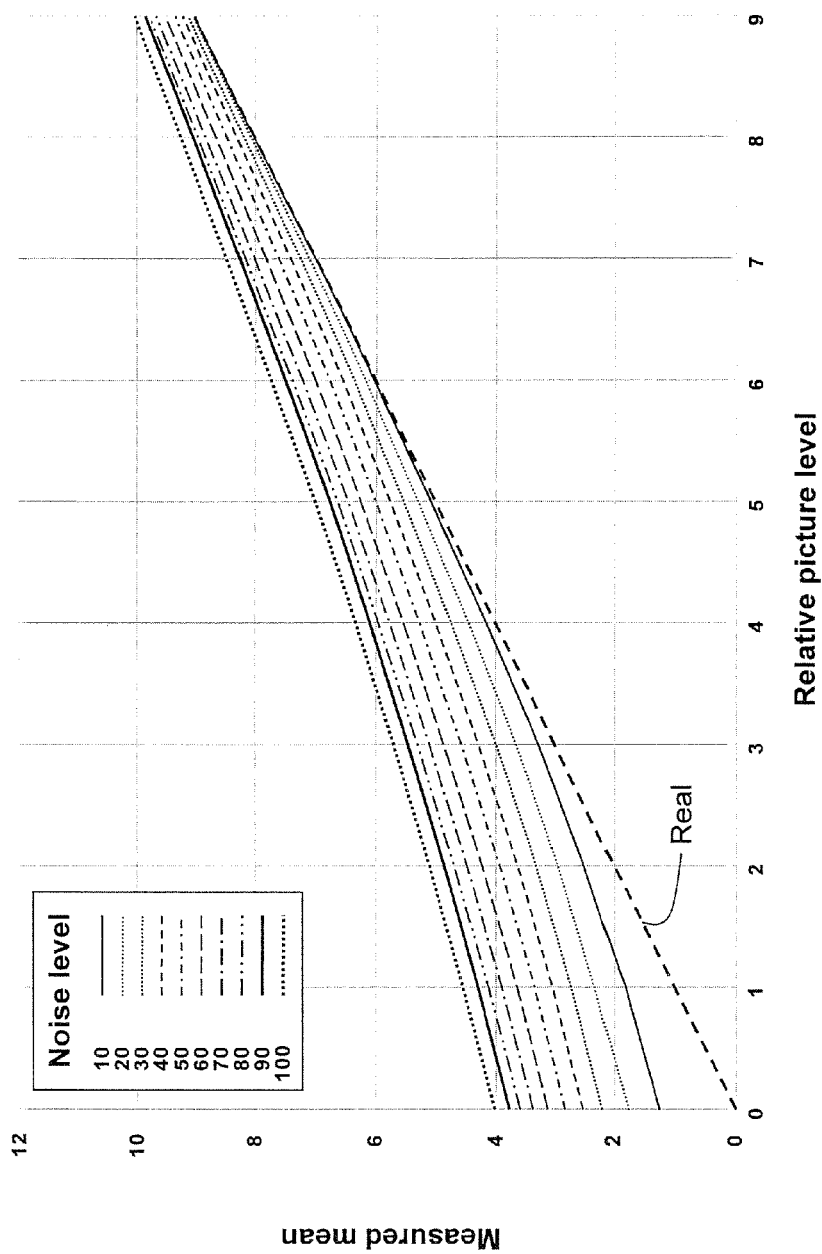
Fig. 5 – Measured Mean Level Change for Saturated Areas

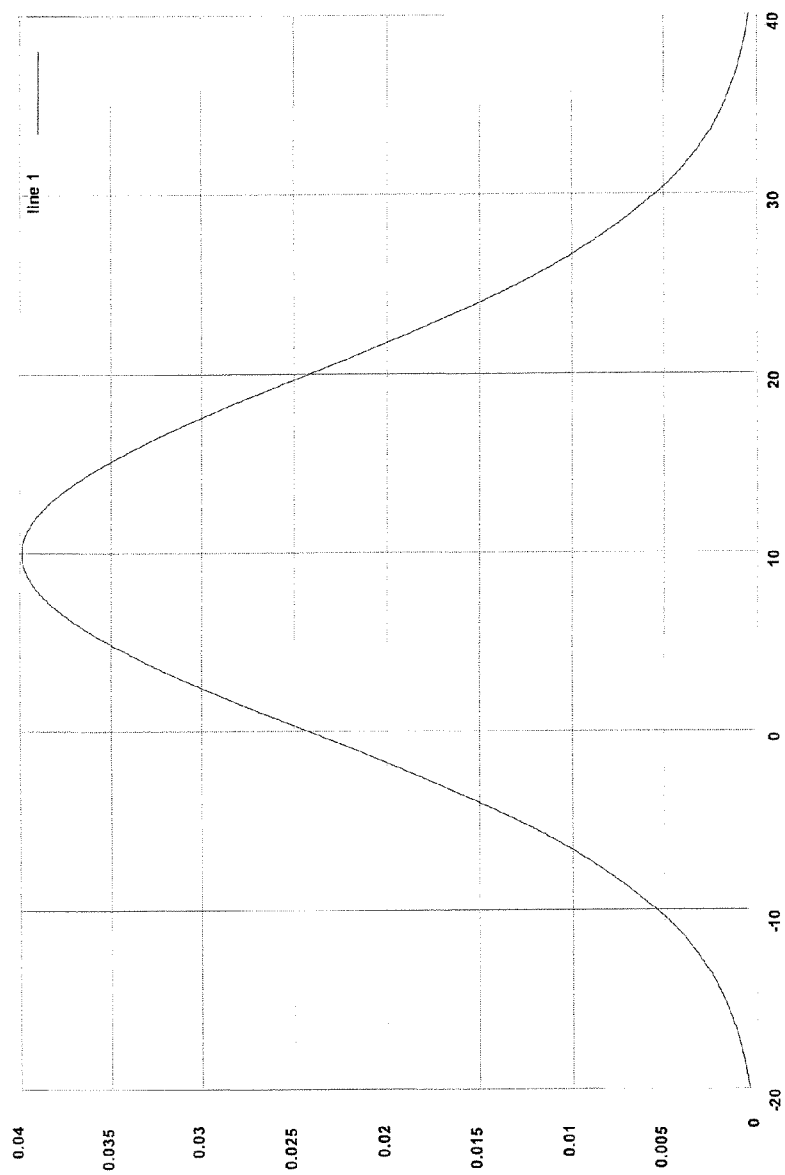
Fig. 6 – Normalised Gaussian Distribution

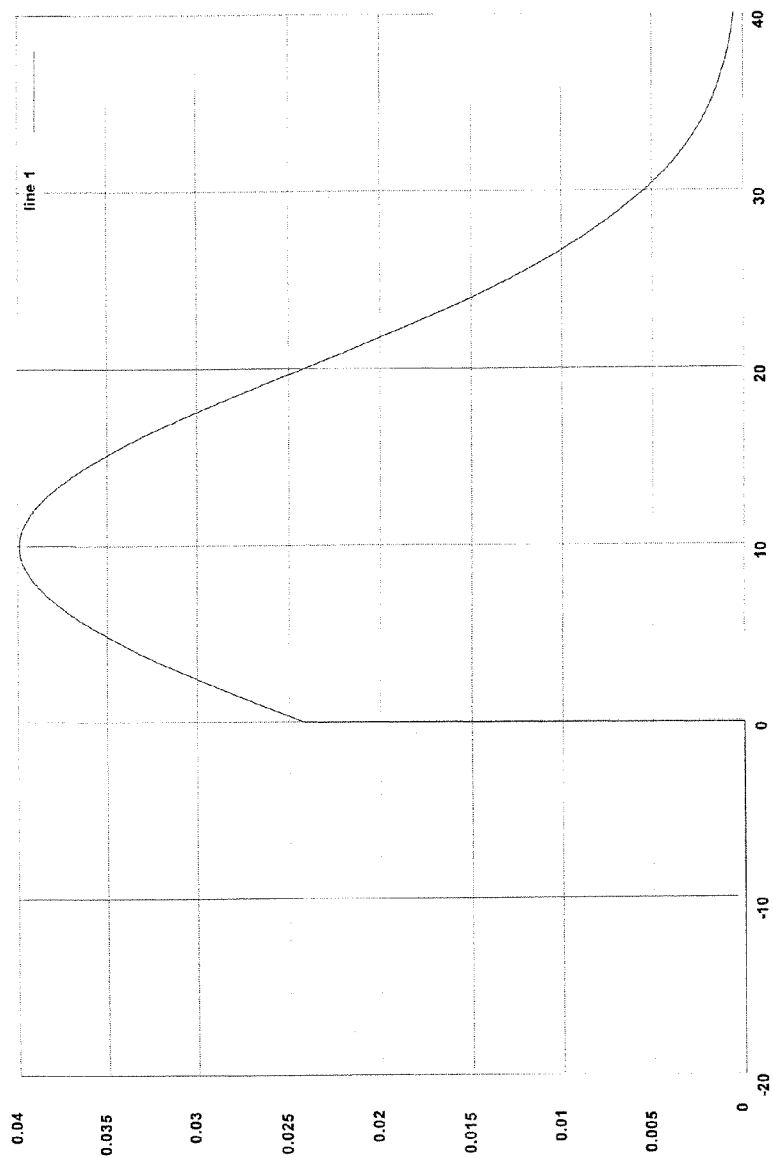
Fig. 7 – Truncated Gaussian Distribution

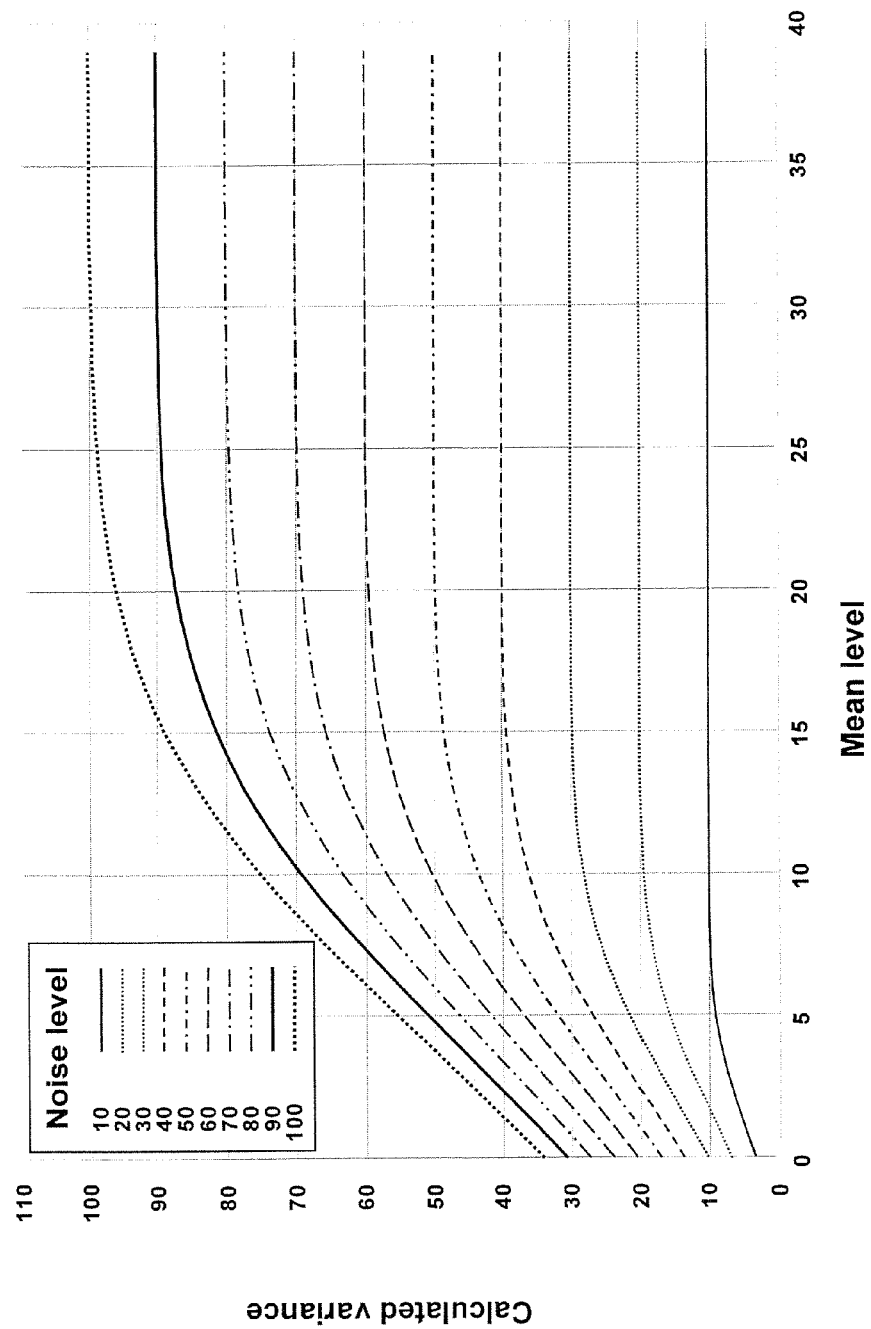
Fig. 8 – Theoretical Variance Attenuation

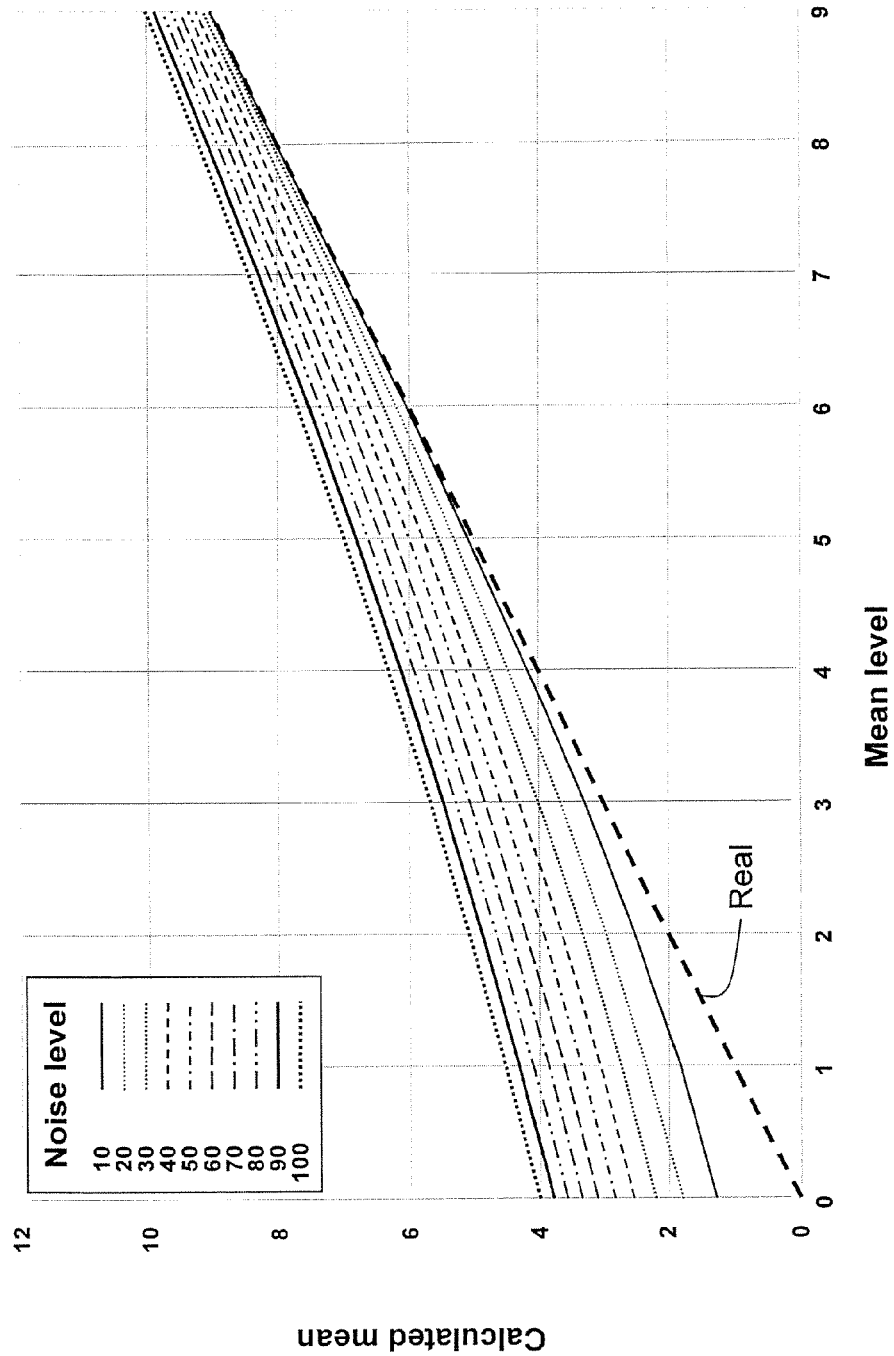
Fig. 9 – Theoretical Mean Level Change

```
#include <math.h>
double erfc(double x)
/*
    Returns the complementary error function erfc(x)
    with fractional error everywhere less than 1.2E-7.
*/
{
    double t,z,ans;
    z=fabs(x);
    t=1.0/(1.0+0.5*z);
    ans=t*exp(-z*z-1.26551223+t*(1.00002368+t*(0.37409196+
    t*(0.09678418+t*(-
    0.18628806+t*(0.27886807+t*(1.13520398+
    t*(1.48851587+t*(-0.82215223+t*0.17087277)))))))));
    return x >= 0.0 ? ans : 2.0-ans;
}
```

Fig. 10 – Possible Error Function Approximation Implementation

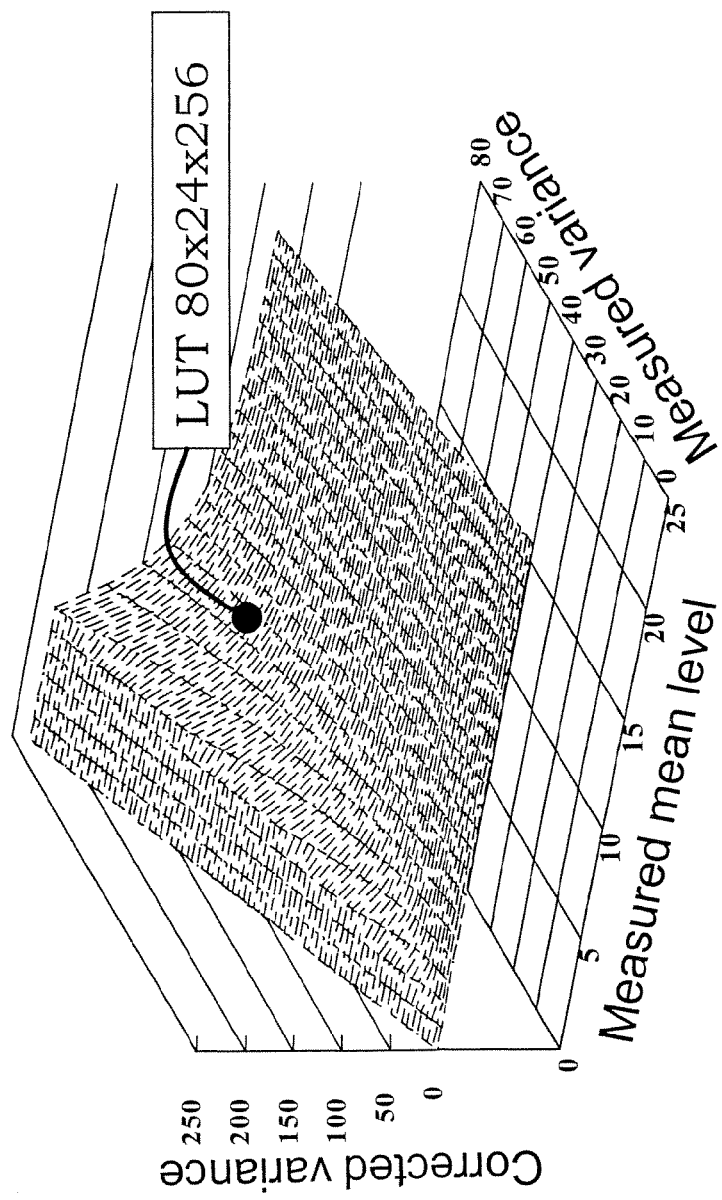
Fig. 11 – Example for LUT Processing

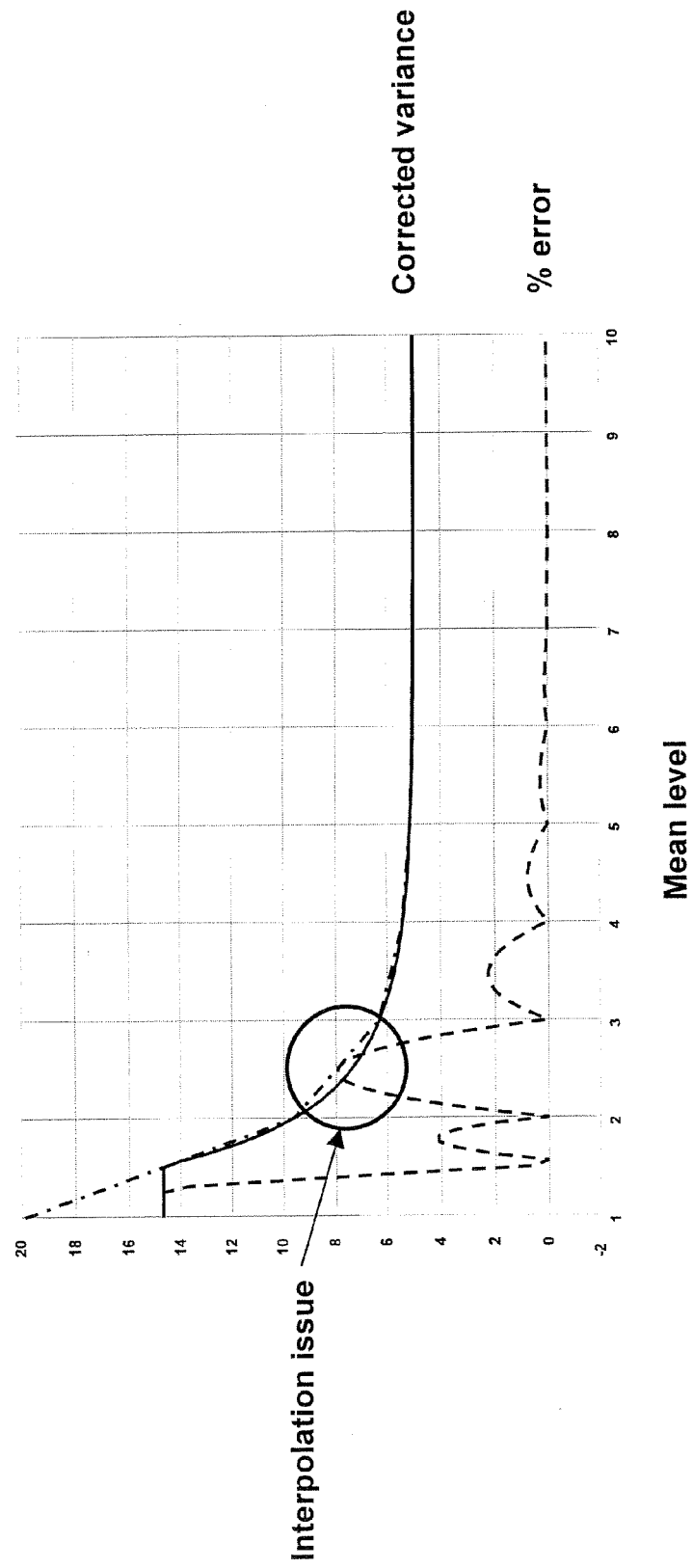
Fig. 12 – 1x Interpolation Processing

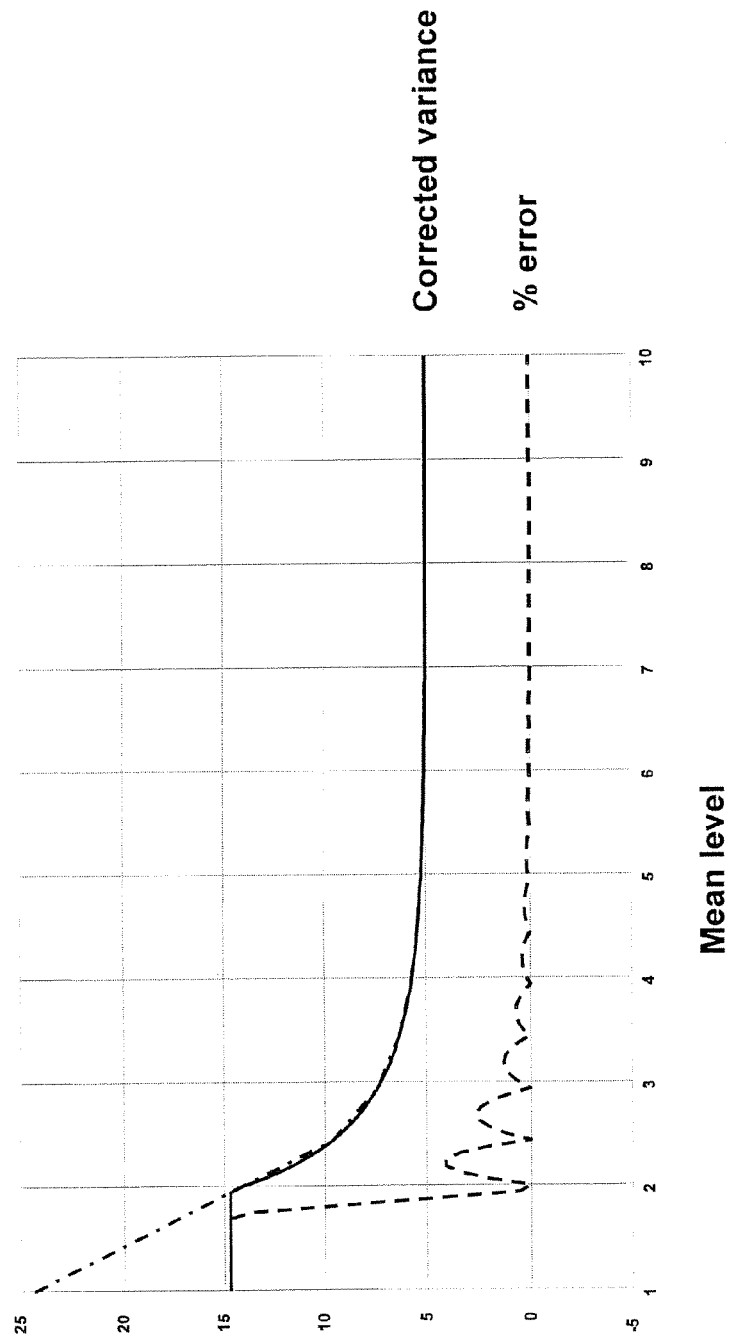
Fig. 13 – 2x Interpolation Processing

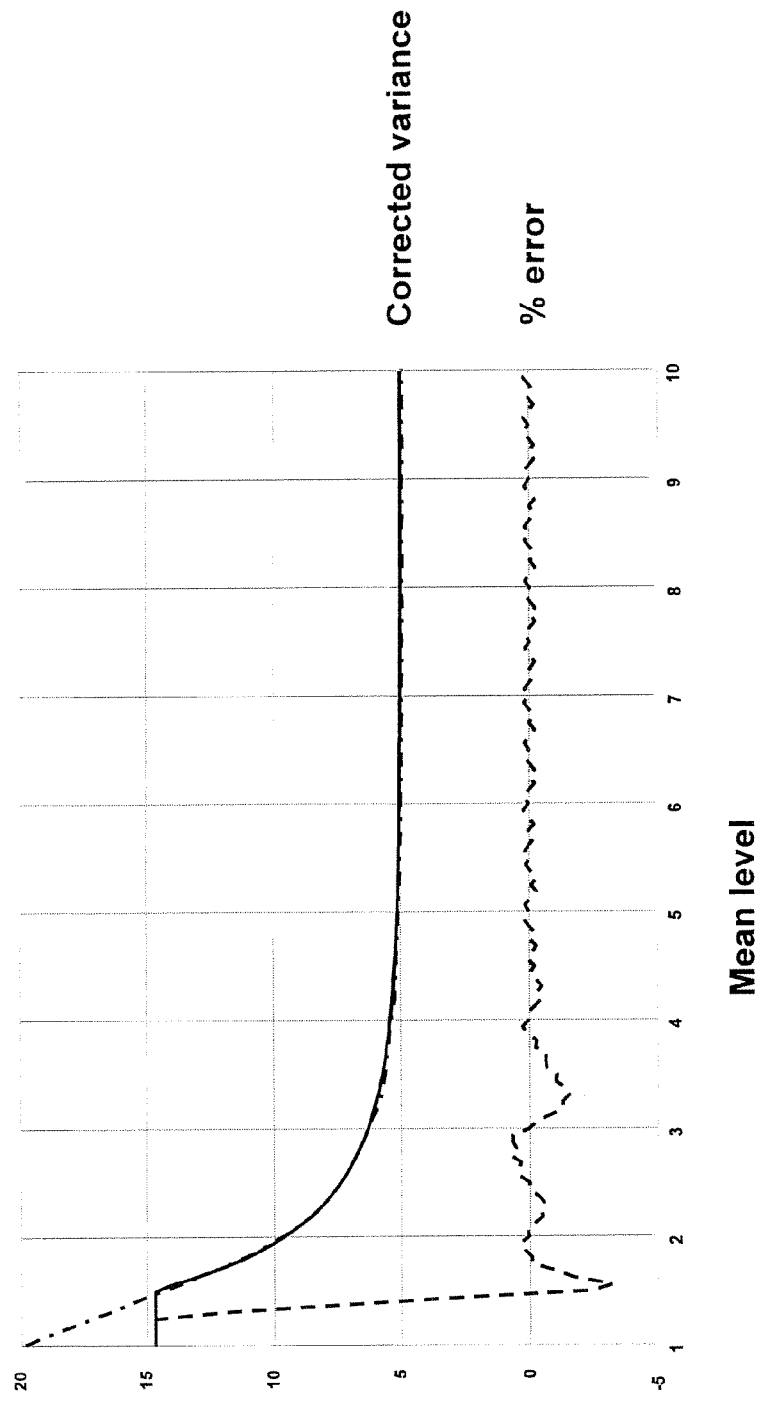
Fig. 14 – FIR Polyphase Processing

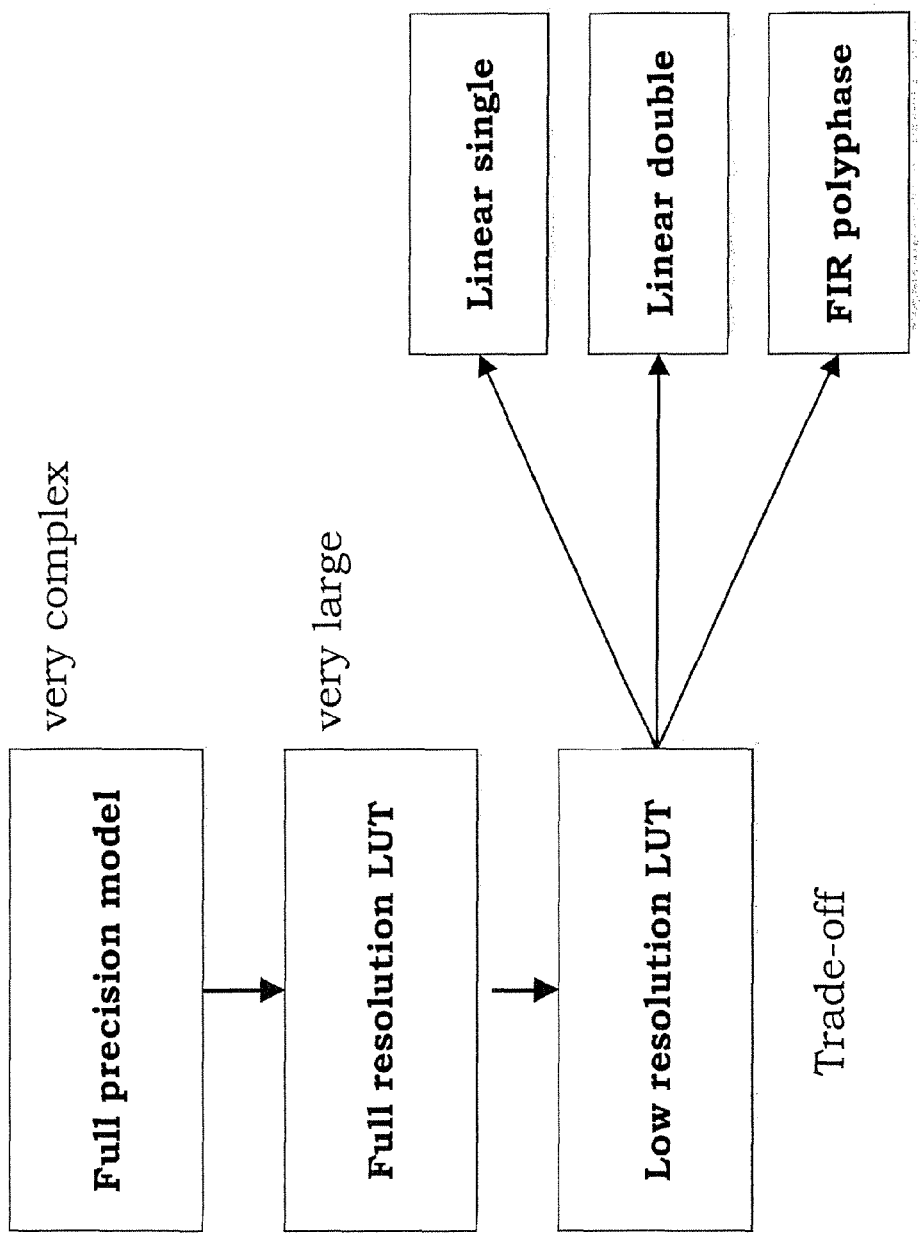
Fig. 15 – LUT example

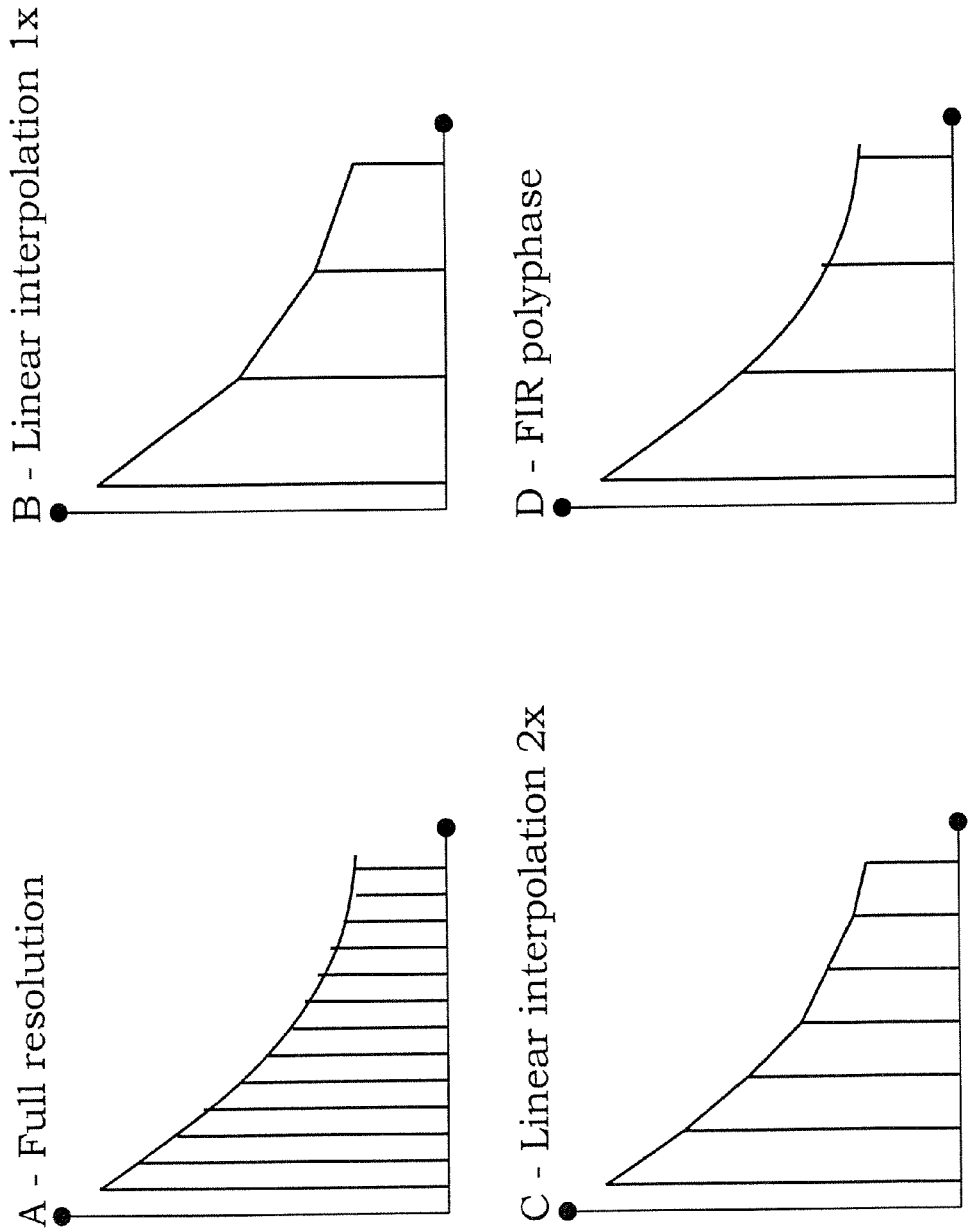
Fig. 16 – LUT Optimisation

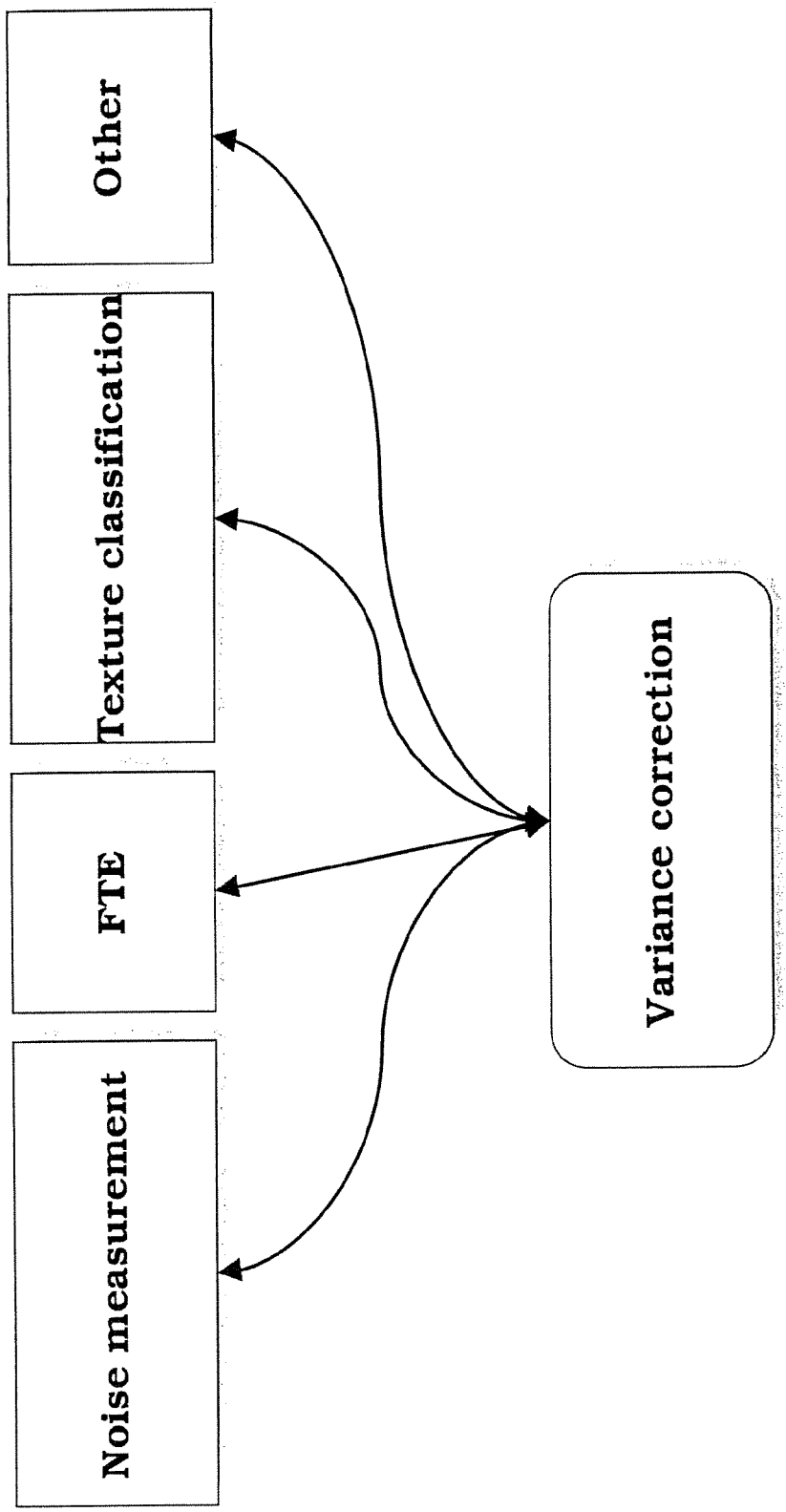
Fig. 17 – Possible Applications

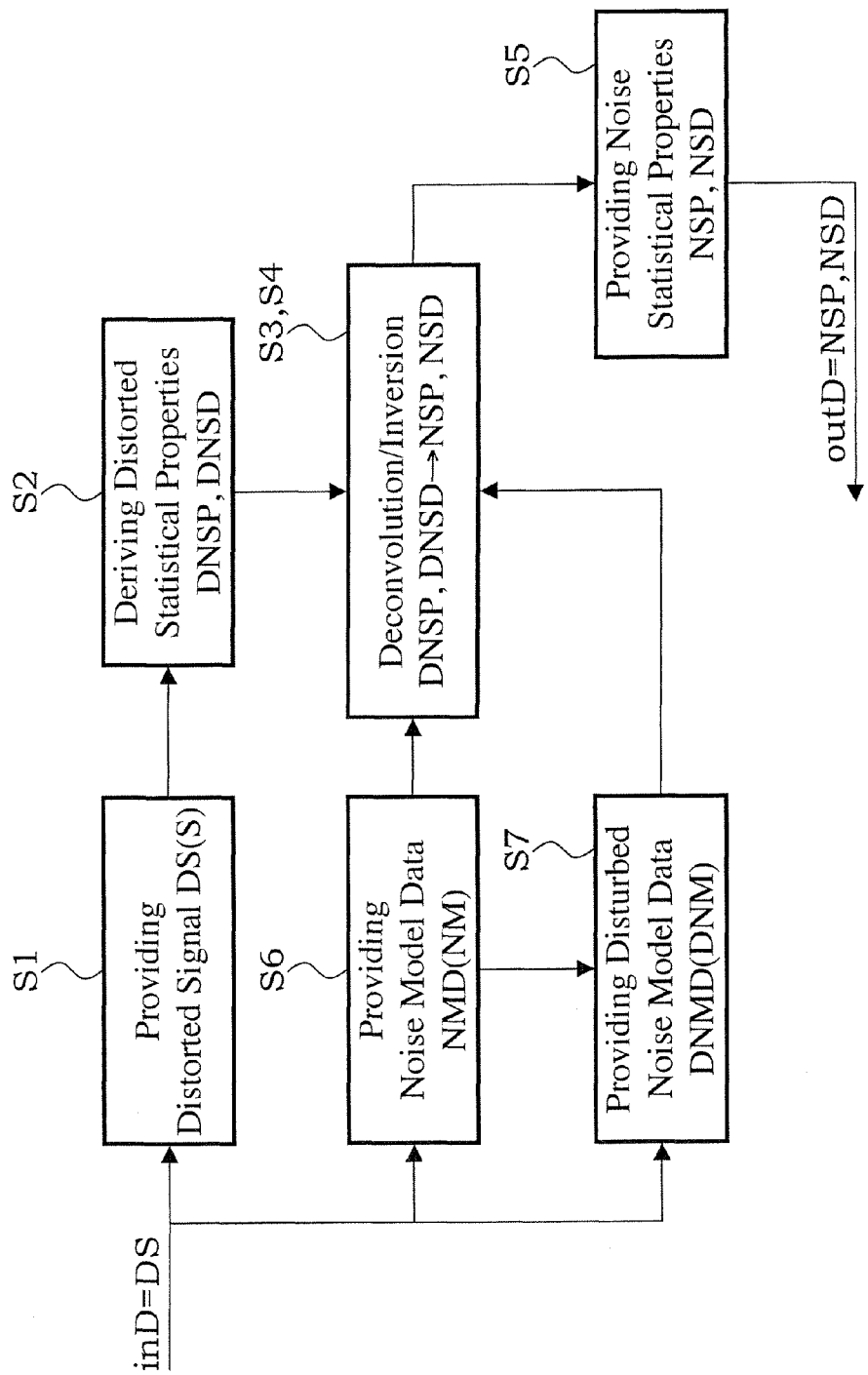
Fig. 18 – Noise Variance and Mean Measurement and Correction 1

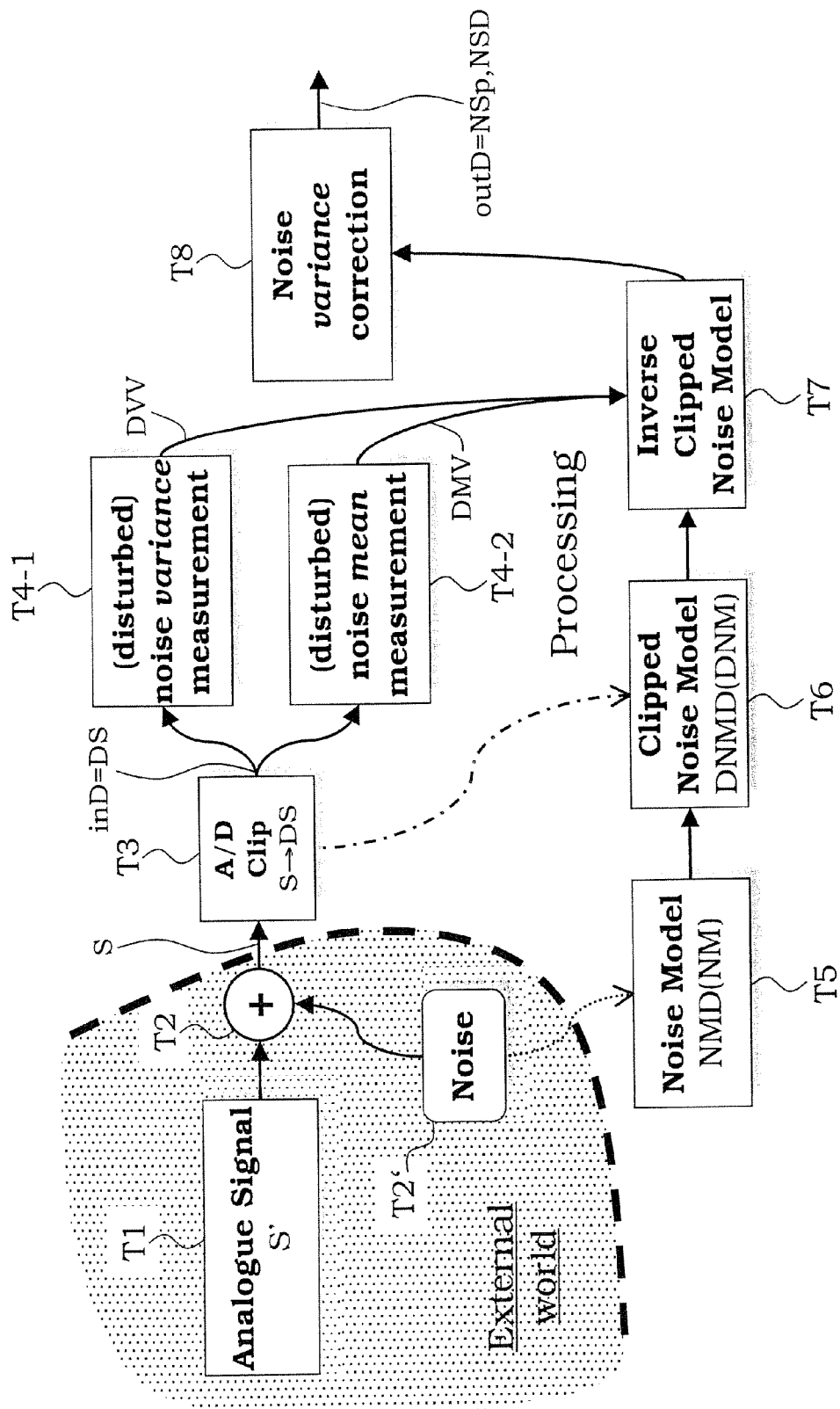
Fig. 19 – Noise Variance and Mean Measurement and Correction 2

METHOD FOR DERIVING NOISE STATISTICAL PROPERTIES OF A SIGNAL

FIELD OF THE INVENTION

The present invention relates to a method for method for deriving noise statistical properties of or for a signal. More particular, the present invention also relates to noise measurement correction in clipped signals.

BACKGROUND OF THE INVENTION

For several aspects of digital picture or digital image processing and their applications, for instance in consumer or customer devices, it is important for the respective processing or even for the application to have an estimate of the respective noise level contained in the respective images, the pictures or the respective signals conveying the same. This is in particular important for so-called noise compensation processes, for instance in image enhancement processing.

In many cases, incomming signals are somewhat distorted by the communication channel or by the receiving equipment, for instance by clipping the incomming signals if the signal's amplitude is too low or to high.

Therefore, many known estimation methods for statistical properties or noise estimation methods are do not derive statistical properties for the incomming signals and only describe the respective already distorted dignal's version and consequently give only very limited information with respect to the original and undistorted incomming signals.

SUMMARY OF THE INVENTION

It is an object of the present invention to provide a method for estimating noise statistical properies for or of a signal which are descriptive for the incomming original signal even if only a distorted signal version can be evaluated.

The object underlying the present invention is achieved by a method for estimating noise in an image sequence according to the present invention with the features of independent claim 1. The object underlying the present invention is further achieved by an apparatus or device, by a computer program product, as well as by a computer readable storage medium according to the features of independent claims 17, 18, and 19. Preferred embodiments are within the scope of the respective dependent sub-claims.

In its broadest sense the present invention suggests to derive noise statistical properties for a signal to be evaluated by deriving distorted noise statistical properties from a corresponding distorted signal and to then apply to said derived distorted noise statistical properties a deconvolution and/or inversion process in order to remove the distortion process.

According to the present invention a method for deriving noise statistical properties for a signal is provided, wherein a distorted signal is provided. Said distorted signal stems or originates from a signal to be evaluated. The signal to be evaluated can be referred to as an ideal signal, whereas the distorted signal is a superposition of the ideal signal with some distortion, for instance some noise. From said distorted signal distorted noise statistical properties are derived. From said distorted noise statistical properties un-distorted noise statistical properties are derived and used and/or provided as said noise statistical properties for said underlying un-distorted signal. This is in particular done by subjecting said derived distorted noise statistical properties to a deconvolution and/or inversion process. Said deconvolution and/or inversion process is based on and/or refers to a respective noise model. The noise model is chosen with respect to the underlying signal to be evaluated.

It is therefore a key idea to derive the desired noise statistical properties for the underlying un-distorted signal by first deriving distorted noise statistical properties and to then apply a deconvolution and/or inversion process to said derived distorted noise statistical properties.

BRIEF DESCRIPTION OF THE DRAWINGS

The invention will now be explained based on preferred embodiments thereof and by taking reference to the accompanying and schematical figures.

FIG. 1 schematically demonstrates possible origins of saturated areas.

FIG. 2 schematically demonstrates possible problems with respect to saturated areas.

FIG. 3 schematically demonstrates examples of saturated areas.

FIG. 4 schematically demonstrates examples for measured variance attenuations with respect to saturated areas.

FIG. 5 schematically demonstrates examples for measured mean level changes for saturated areas.

FIG. 6 schematically demonstrates by means of a graphic representation the normalized Gaussian distribution.

FIG. 7 demonstrates by means of a graphical representation a truncated Gaussian distribution.

FIG. 8 is a graphical representation for elucidating the theoretical variance attenuation for different noise levels.

FIG. 9 is a graphical representation for elucidating the theoretical mean level change as a function of different noise levels.

FIG. 10 elucidates a possible implementation for an error function approximation.

FIG. 11 is a graphical representation which elucidates an example for an LUT processing.

FIG. 12 is a graphical representation for elucidating an example of an interpolation process.

FIG. 13 is a graphical representation for elucidating an example of an interpolation process.

FIG. 14 is a graphical representation for elucidating an example of an interpolation process.

FIG. 15 is a schematic block diagram for elucidating aspects of an LUT processing.

FIGS. 16A-D are graphical representations for elucidating optimization aspects for LUT processings.

FIG. 17 schematically demonstrate some possible applications of the inventive approach.

FIG. 18 is a schematical block diagram for elucidating some basic aspects of a preferred embodiment of the present invention.

FIG. 19 is a schematical block diagram for elucidating some basic aspects of a preferred embodiment of the present invention.

DETAILED DESCRIPTION OF THE INVENTION

In the following functional and structural similar or equivalent element structures will be denoted with the same reference symbols. Not in each case of their occurrence a detailed description will be repeated.

The present invention provides inter alia a method for deriving noise statistical properties NSP for a signal S, (a) wherein a distorted signal DS stemming or originating from an underlying signal S to be evaluated is provided (S1), (b) wherein distorted noise statistical properties DNSP are derived (S2) from said distorted signal DS, (c) wherein said distorted noise statistical properties DNSP are subjected to a deconvolution and/or inversion process (S3) with respect to a respective noise model NM for said underlying signal S to be evaluated, and (d) wherein thereby undistorted noise statistical properties are derived (S4) as said noise statistical properties NSP for said underlying undistorted signal S.

Said deconvolution and/or said inversion process (S3) may be designed in order to remove the effect of distortion in particular with respect to said distorted noise statistical properties DNSP.

Said distortion may be given as at least one of the group consisting of a distortion function and a distortion distribution.

Said distortion may be given as at least one of the group consisting of clipping and filtering.

Said distortion function or distortion distribution may be invertible and/or may have a unique inverse distortion function or distortion distribution, respectively.

Said at least one of said distorted noise statistical properties DNSP, said undistorted noise statistical properties, and said noise statistical properties NSP or a part thereof may be given as respective distorted noise statistical data DNSD, undistorted noise statistical data and noise statistical data NSD, respectively.

At least one of said undistorted noise statistical data DNSD, said undistorted noise statistical data, and said noise statistical data NSD may comprise and describe at least one of the group consisting of statistical mean and statistical variance.

Said noise model NM may be given by at least one of the group consisting of noise model function and noise model distribution.

Said noise model function and said noise model distribution may be invertible and/or have a corresponding unique inverse noise model function and noise model distribution, respectively.

wherein said noise model function and said noise model distribution is a Gaussian type function or a Gaussian type distribution.

Said process of deconvolution and/or inversion (S3) may be at least in part performed analytically.

Said process of deconvolution and/or inversion (S3) may be at least in part performed numerically.

Said process of deconvolution and/or inversion (S3) may be at least in part performed iteratively.

Additionally or alternatively, the inventive method is designed in a way (e) that a mean value and/or a variance value are first derived or measured from said and for said distorted signal DS as a distorted mean value DMV and/or as a distorted variance value DVV, respectively, (f) wherein then said measured mean value DMV and said measured variance value DVV are initially set and used as starting iteration values and as intermediate iteration values, (g) wherein then for the next iteration step based on one of said intermediate iteration values for said variance and said mean the other one of said values for said variance and said mean is evaluated by numerical inversion and taken as a new respective intermediate iteration value for the other one of said variance and said mean, respectively, (h) wherein then based on the other one of said intermediate iteration values for said variance and said mean the one of said values for said variance and said mean is evaluated by numerical inversion and taken as a new respective intermediate iteration value for the one of said variance and said mean, respectively, (j) wherein said steps (g) and/or (h) are repeated for the next iteration step until given stopping criteria are fulfilled, and (k) wherein after stopping the iteration the recently evaluated and calculated iteration values for said variance and for said mean are taken as said noise statistical data NSD or as a part or pre-form thereof.

Said stopping criteria may be referred to as being fulfilled if the differences of the values for the variance and/or for the mean of directly succeeding iterations or iteration steps are below given respective threshold values.

A look-up table LUT may be formed in a pre-defined manner in order to represent a one-to-one relationship between said distorted noise statistical properties or said distorted noise statistical data DNSP, DNSD and said respective non-distorted noise statistical properties or said respective non-distorted noise statistical data NSP, NSD.

According to a further aspect of the present invention a system, device, or apparatus are provided for deriving noise statistical properties NSP for a signal S, which are adapted and which comprise means for carrying out a method for deriving noise statistical properties NSP for a signal S according to the present invention.

Additionally, according to still a further aspect of the present invention a computer program product is provided, comprising computer program means which is adapted and arranged in order to perform a method for deriving noise statistical properties NSP for a signal S according to the present invention and the steps thereof, when it is executed on a computer or a digital signal processing means.

In addition, a computer readable storage medium is provided, comprising a computer program product according to the present invention.

These and further aspects of the present invention will be further discussed in the following:

The present invention inter alia also relates to methods and apparatuses for noise measurement correction in clipped signals.

In particular, also a method for correcting clipped analogue noise measurement by means of inverse clipped noise model evaluation and compensation is provided according to the present invention.

Several noise measurement technologies were developed, but none deals directly with the clipped noise problems.

Analogue noise measurement, specifically after digitisation, will fail when the main signal is too low or too high due to clipping behaviour of the A/D converters. The measured noise will be always less than the real one under these conditions. In case of a signal, in which the noise is measurable only in the clipped part, while the "normal" part is not measurable, this situation will lead to a false understanding of the noise and consequent wrong noise-dependent post-processing.

This method, given the model noise, is able to recover the original noise level from the clipped signal.

While the problem seems to be somehow known, no solution was found in literature.

First of all, the noise model needs to be known. In the discussion Gaussian noise is always assumed, whenever not explicitly stated. While the autocorrelation behaviour of the noise (i.e. noise colour) is not important.

The noise parameter, which needs to be recovered, is the noise variance. While the noise mean is usually not important, it is anyway possible to recover this information too.

The way to proceed is as follow: given the noise model, the clipped noise model is derived. This could be by mathematical means, i.e. noise equations re-evaluation, or by empirical means, i.e. noise generation, clipping and parameters remeasurement.

In case of Gaussian noise, the clipping will affect variance and mean. Specifically the variance will be attenuated, i.e. multiplied by a positive value smaller than 1, and the mean will be offset, i.e. a positive value will be added. This behaviour should be similar for all kind of noises.

The idea it to measure variance and mean in a specific area, i.e. variance and mean should belong to the same data set, and then apply the inverse clipped noise model, in order to recover the original variance and mean. It is worth to note that Gaussian noise is completely defined by variance and mean. In case of other types of noise, all the relevant statistical descriptive data has to undergo the same procedure.

If the clipped noise model is an invertible equation, the solution is easy. Usually this is not the case. The clipped Gaussian noise has a mathematical description that is hardly invertible, maybe it is even not possible to invert, and so a different approach is needed. The same applies in case of empirical clipped noise modelling, where only a matrix of values is available.

Assuming the direct form of the clipped noise model is available, an inverse form is derived by numerical inversion. This is usually possible since these equations should be monotonic in all variables.

The problem with Gaussian noise, clipped or not, is that variance and mean are strictly related, i.e. one depends on the other and simple inversion is possible only if one of the two is known, which is never the case.

The way to proceed is to assume that one of the two measured values, variance or mean, is the correct one. Then the other is evaluated by numerical inversion. This new value is considered to be the correct one and used to re-calculate, still by numerical inversion, the first one. The procedure continues until a reasonable approximation of the real variance and mean is achieved. This could be after a fixed amount of steps or after the calculated variance and mean stabilize, i.e. they will not vary too much iteration after iteration. It is worth to note that this process is guarantee to converge, due to the fact that the inverted variance will be always greater than the measured one and the inverted mean will be always smaller than the measured one.

Of course the whole process can be pre-calculated and a look-up table (LUT) can be used in order to get real variance (and mean) from the measured ones.

In case of LUT usage a further consideration can be done: the inverse function could be quite smooth, i.e. the difference from sample to sample is never too strong and the map is monotonic. Under these conditions it would be possible to store the LUT in a sub-sampled form, i.e. with a larger sample step, and re-interpolate it for the missing values.

Since the corrected variance is always bigger than the measured one, one other option is to store only the difference, which could usually lead to a smaller LUT.

Of course, in general, this approach will work for any kind of noise, statistically defined by measurable parameters, which usually are variance and mean.

In principle any other kind of deterministic signal distortion, besides clipping, can be corrected with this method.

The normal approach is to reject the measured noise in areas that are not considered reliable due to too low or too high signal amplitude.

This solution makes possible to obtain the real noise parameters from these extreme measurement areas.

This is very important in video application, where it could be possible that the measurable area, usually static, is too dark (or to bright), while the "content" area is not measurable, for example because of motion.

Any processing, which relies on noise level for proper operation, will fail in the "content" area due to incorrect noise measurement, if the correction explained above is not applied.

The present invention has particular importance in cases where noise has to evaluated in images, frames, or pictures having areas which are too bright or too dark. These areas are also called saturated areas:

In saturated areas—too bright or too dark image content—noise measurement becomes unreliable due to clipping and rounding. For this reason such areas are discarded, for example, by the DA noise-measurement algorithm. In certain sequences this leads to discarding almost every image area for noise measurement Eventually no reliable noise figure can be obtained for such a sequence.

In the following reference is taken to the accompanying FIGS. 1 to 19.

Before going into details reference is taken to FIGS. 18 and 19 in order to explain some basic principles underlying the present invention.

FIG. 18 is a block diagram for elucidating some basic aspects of a preferred embodiment of the inventive method for deriving noise statistical properties NSP for a signal S.

The whole approach as shown in FIG. 18 is based on the assumption that an underlying signal S exists which has to be evaluated. The underlying signal S to be evaluated is referred to as an ideal signal. Said ideal signal suffers from some distortion, for instance from noise, which are exerted to the ideal signal S through physical interaction within the transmission channel for the signal S.

Therefore, in a first step S1 a distorted signal DS which is a superposition of the ideal signal S to be evaluated and a respective distortion process is received as input data in D with in D(S)=DS as a distorted signal DS. In a following step S2 distorted noise statistical properties DNSP are derived from said distorted signal DS as distorted noise statistical data DNSD. Accordingly, a distorted variance value DVV and a distorted mean value DMV may be derived from said distorted signal DS which described the variance and the mean of a distorted signal DS, respectively.

In a independent processing path in a step S6 noise model data NMD for a noise model NM for the underlying ideal and un-distorted signal S are provided.

In a further step S7 distorted noise model data DNMD for a distorted noise model DNM are derived which are descriptive for a noise model for the distorted signal DS.

The obtained distorted noise statistical properties in the sense of distorted noise statistical data are fed into a further step S3/S4 which performs a deconvolution and/or inversion process also taken into account the noise model data of the underlying noise model as well as the distorted noise model data DNMD of the distorted noise model DNM provided by steps S6 and S7. The deconvolution and/or inversion process of steps S3, S4 may be performed analytically or numerically. As a result noise statistical properties NSP in the sense of noise statistical data NSD for the un-distorted and ideal signal S are derived and provided in a further step S5 as output data outD, for instance as a variance value VV and as a mean value MV for the ideal and un-distorted signal S underlying the whole process.

FIG. 19 is a schematic block diagram for elucidating a further preferred embodiment of the inventive method for deriving noise statistical properties NSP for a signal S, where a specific type of distortion, namely a clipping process is analyzed.

In a first step T1 an analogue signal S which is an undisturbed and primary and ideal signal is generated. According to further steps T2 and T2' due to some physical interaction in the transmission channel noise is added to the analogue ideal signal S', thereby generating a signal S underlying the whole approach for which noise statistical properties or noise statistical data NSP, NSD in the sense of a variance value VV and a mean value MV are to be derived.

Within the process of reception the signal S underlying the whole process has to be analogue-to-digital converted according to the A/D step T3. For some instances—namely for particular high or low amplitudes of the signal S together with its noise—clipping occurs as a distortion, thereby generating from said underlying signal S a distorted signal DS.

In further steps T4-1 and T4-2 from said distorted signal DS a distorted variance value DVV and a distorted mean value DMV are derived as a variance value and as a mean value for the distorted signal DS and provided to a step T7.

In step T7 data which are descriptive for a distorted or clipped noise model are used in order to perform an inversion and/or a deconvolution of the clip noise model with respect to the distorted variance value and with respect to the distorted mean value in order to derive in the following step T8 a correction for the distorted noise statistical properties or distorted noise statistical data which are measured from the distorted signal DS to the noise statistical properties or noise statistical data NSP, NSD for the un-distorted signal S to be evaluated, in particular a variance correction from the distorted variance value DVV to the correct variance value VV for the un-distorted signal S is derived.

The inversion of the clip noise model is in particular controlled by data which are derived in steps T5 for analyzing the underlying noise model for the signal S to be evaluated and by the data of step T6 of analyzing a clip noise model in which the distortion is analyzed with respect to its effect on the signal and the noise contained therein.

FIG. 1 demonstrates a possible origin of saturated areas. Gaussian white noise is an analogue domain issue. It can bring the signal out of the specifications. The A/D converter will cut everything which is not in the intended range, including noise.

FIG. 2 demonstrates a possible problem of saturated areas. It can happen that good measurement areas are not available, for example due to motion or other constrains.

FIG. 3 demonstrates examples of saturated areas, wherein problems arise when objects are present which show motion.

FIG. 4 demonstrates an examples of the measured variance attenuation for saturated areas.

FIG. 5 demonstrates an examples of the measured mean level change for saturated areas.

Modelling the situation requires some background about the type of noise that is considered. The principle can be explained by considering the Gaussian distribution as a noise model function NMF or noise model distribution NMD:

If $f(\bullet)$ denotes the Gaussian distribution, $P(\bullet)$ denotes the probability function of $f(\bullet)$, and $P_n(\bullet)$ denotes the probability function of the normal or normalised Gaussian distribution, then the following relationships (1)-(3) are fulfilled:

$$f(x) = \frac{1}{\sqrt{2\pi\sigma^2}} \cdot e^{-\frac{(x-m)^2}{2\sigma^2}}, \tag{1}$$

$$P(z) = \int_{-\infty}^{z} f(x)dx, \tag{2}$$

$$P_n(z) = \frac{1}{\sqrt{2\pi}} \cdot \int_{-\infty}^{z} e^{-\frac{x^2}{2}} dx. \tag{3}$$

FIG. 6 demonstrates the graphical representation for the normalised Gaussian distribution $f(\bullet)$.

Let $f_0(\bullet)$ denoted the truncated Gaussian function or Gaussian distribution with the following definition (4):

$$f_0(x) = \begin{cases} \frac{1}{\sqrt{2\pi\sigma^2}} \cdot e^{-\frac{(x-m)^2}{2\sigma^2}} & x > 0 \\ \delta(x) \cdot P(0) & x = 0. \\ 0 & x < 0 \end{cases} \tag{4}$$

FIG. 7 demonstrates the graphical representation for a truncated Gaussian distribution $f_0(\bullet)$.

Let $m_0(\bullet,\bullet)$ denote the average of truncated Gaussian function of full range Gaussian input, $M_0(\bullet,\bullet)$ denote statistical power or intermediate value, and $\sigma_0^2(\bullet,\bullet)$ denote the variance of the truncated Gaussian signal, then the following relationships (5) to (7) are fulfilled:

$$m_0(m, \sigma) = m \cdot \left[1 - P_n\left(-\frac{m}{\sigma}\right)\right] + \sigma \cdot \frac{1}{\sqrt{2\pi}} \cdot e^{-\frac{m^2}{2\sigma^2}}, \tag{5}$$

$$M_0(m, \sigma) = m^2 \cdot \left[1 - P_n\left(-\frac{m}{\sigma}\right)\right] + 2\sigma \cdot m \cdot \frac{1}{\sqrt{2\pi}} \cdot e^{-\frac{m^2}{2\sigma^2}} + \tag{6}$$

$$\sigma^2 \cdot \left[\left(-\frac{m}{\sigma}\right) \cdot \frac{1}{\sqrt{2\pi}} \cdot e^{-\frac{m^2}{2\sigma^2}} + 1 - P_n\left(-\frac{m}{\sigma}\right)\right]$$

$$\sigma_0^2(m, \sigma) = M_0(m, \sigma) - m_0^2(m, \sigma). \tag{7}$$

The inversion problem has to be solved, i.e. given the measured values for the functions $m_0(\bullet,\bullet)$ and $\sigma_0^2(\bullet,\bullet)$ of the truncated Gaussian the mean $m_0(\bullet,\bullet)$ and the variance $\sigma_0^2(\bullet,\bullet)$ of the corresponding non-truncated Gaussian have to be derived, in particular according to the following relation (8):

$$\left.\begin{array}{c} m_0(m, \sigma) \\ \sigma_0^2(m, \sigma) \end{array}\right\} \Rightarrow \left\{\begin{array}{c} m \\ \sigma^2 \end{array}\right., \tag{8}$$

i.e. from a given function $F:R^2 \rightarrow R^2$ an inverted function $F^{-1}:R^2 \rightarrow R^2$ has to derived.

Inverting such functions F is in general not a trivial issue, first because they are complex by themselves, second because of the space dimension.

There are anyway some aspects that can allow a certain procedure, for example both functions are monotonic, in both variables.

A walk-back procedure can be used in order to invert the two functions and in order to obtain the real mean and variance from the measured ones. This can for instance be realized according to the following cascade of iterative approximations $m_j$ and $\sigma_j^2$ for m and $\sigma^2$ according to the following steps (9-1), (9-2), (9-3)

$$\sigma_1^2 = \sigma_0^2(m_0,\sigma_0)^{-1} \text{ and } m_1 = m_0(m_0,\sigma_1)^{-1}, \tag{9-1}$$

$$\sigma_2^2 = \sigma_0^2(m_1,\sigma_0)^{-1} \text{ and } m_2 = m_0(m_0,\sigma_2)^{-1}, \tag{9-2}$$

$$\sigma_3^2 = \sigma_0^2(m_2,\sigma_0)^{-1} \text{ and } m_3 = m_0(m_0,\sigma_3)^{-1}, \tag{9-3}$$

...

For functions F of a single variable inversion can be done numerically.

It is important to note the following about the function $P_n(\bullet)$. It is usually available in lookup tables or, more important, using the error function erf(•) and the complementary error function erfc(•), provided by numerical libraries, according to the relations (10) and (11):

$$\mathrm{erf}(x) = \frac{2}{\sqrt{\pi}} \cdot \int_0^x e^{-t^2} dt, \quad (10)$$

$$\mathrm{erfc}(x) = \frac{2}{\sqrt{\pi}} \cdot \int_x^\infty e^{-t^2} dt = 1 - \mathrm{erf}(x). \quad (11)$$

With (10) and (11) one obtains from (5), (6) and (7) the following relations (12), (13), and (14):

$$m_0(m, \sigma) = m \cdot \left[1 - \frac{1}{2}\mathrm{erfc}\left(\frac{m}{\sigma\sqrt{2}}\right)\right] + \sigma \cdot \frac{1}{\sqrt{2\pi}} \cdot e^{-\frac{m^2}{2\sigma^2}}, \quad (12)$$

$$M_0(m, \sigma) = m^2 \cdot \left[1 - \frac{1}{2}\mathrm{erfc}\left(\frac{m}{\sigma\sqrt{2}}\right)\right] + 2\sigma \cdot m \cdot \frac{1}{\sqrt{2\pi}} \cdot e^{-\frac{m^2}{2\sigma^2}} + \quad (13)$$

$$\ldots + \sigma^2 \cdot \left[\left(-\frac{m}{\sigma}\right) \cdot \frac{1}{\sqrt{2\pi}} \cdot e^{-\frac{m^2}{2\sigma^2}} + 1 - \frac{1}{2}\mathrm{erfc}\left(\frac{m}{\sigma\sqrt{2}}\right)\right]$$

$$\sigma_0^2(m, \sigma) = M_0(m, \sigma) - m_0^2(m, \sigma). \quad (14)$$

FIG. 10 demonstrates a possible error function approximation implementation.

A further possible approach is the so called look-up-table or LUT processing with having in advance made all necessary calculations listed and stored in a table means from which the necessary calculation results and values can be obtained by looking them up.

Some advantages of the LUT method are given as follows:
LUT could be a simple solution to the noise variance measurement correction in saturated areas.
LUT will avoid complex calculation of exponentials.
LUT can be upgraded in case different noise models are considered.
LUT input is the measured variance and mean value.
LUT output is the corrected (real) variance.
LUT size is the limiting factor for implementation.
Trade off precision vs. size.
Optimisation in order to reduce size.

FIG. 11 gives a possible example for the LUT processing.

The LUT should be dimensioned properly. Small LUTs are easy to handle, but it leads to poor precision. Large LUTs are bulky, but can carry good precision.

To solve these problems the following aspects can be adopted:
Full precision LUT.
Integer steps LUT and linear interpolation.
Half integer steps LUT (double size) and linear interpolation.
Integer steps LUT and cubic spline interpolation.

Also, the sensitivity of the correction function is a key factor in designing the LUT step size. The measured mean direction is by far more sensitive than the measured variance, i.e. the required measured mean precision is higher than the measured variance one.

FIGS. 12, 13, and 14 give graphical representations for interpolation results in order to obtains mean and variance values from measured mean and variance values.

In FIG. 12 the measured variance is 5. The LUT is designed with integer steps and linear interpolation. The LUT is linearly extended in the unreachable zone.

In FIG. 13 the measured variance is 5. The LUT is designed with half integer steps (double size LUT) and linear interpolation. The LUT linearly extended in the unreachable zone.

In FIG. 14 the measured variance is 5. The LUT with integer steps and polyphase interpolation. The LUT is linearly extended in the unreachable zone.

The following aspects are also important for the present invention:
Provide correct (noise) variance in critical areas (saturated) is possible.
Analysis of the model provided accurate results in order to predict the real noise level.
Computational effort could be too complex for a reasonable implementation.
LUT can be an affordable solution.
Linear interpolation of result can lead to high precision results, while keeping the LUT small. The price to pay is the need of more computational resources.
The proposed LUT solution can be integrated into noise reduction ICs in order to thereby realize apparatus or device embodiments of the present invention.

FIG. 15 again elucidates by means of a schematic block diagram aspects of the LUT approach as are inter alia explain in FIGS. 12 to 14.

With respect to the optimisation of the LUT approach the following aspects are important:
LUT should provided enough precision and usable range within minimum size.
Range should be determined by the use case and affects directly the LUT size.
Precision should also set by use case, but can be obtained by usage of interpolators together with LUT data, thus reducing the LUT size.
A trade off exists between LUT size, precision and interpolator complexity.
Investigation of this trade off was the second part of the saturated areas noise measurement correction.

FIGS. 16A to 16D elucidate optimisation aspects of the LUT approach by also referring to the situations as shown in FIGS. 12 to 14.

A possible solution may be proposed as follows:
Full resolution LUT
Integer steps LUT+linear interpolation
Half integer steps LUT (double size)+linear interpolation
Integer steps LUT+4 taps FIR interpolation Assuming an input range of 0-23 (mean) and 1-80 (variance), the following calculation can be made:
153600 bits
13440 bits+2 multipliers+1 adder
26880 bits+2 multipliers+1 adder
13952 bits+4 multipliers+3 adders+some minor logic An offset LUT will further reduce the number of required bits.

FIG. 17 shows some possible applications.
The following conclusions may be obtained.
Provide correct noise variance in critical areas is possible.
Corrected variance measurement is necessary for all the applications those rely on variance knowledge (for example FTE algorithm, texture classification, noise measurement, etc.)
Analysis of the model provided accurate results in order to predict the real noise level.
Computational effort could be too complex for a reasonable implementation.
LUT can be an affordable solution.
To dimension properly the LUT some information about required range and precision is necessary.

Interpolation of result can lead to high precision results, while keeping the LUT small. The price to pay is the need of more computational resources.

REFERENCE SYMBOLS

DMV distorted mean value
DNM distorted noise model
DNMD distorted noise model data
DNSD distorted noise statistical data
DNSP distorted noise statistical properties
DS distorted signal
DVV distorted variance value
inD input data
MV mean value
NM noise model
NMD noise model data
NSD noise statistical data
NSP noise statistical properties
outD output data
S signal to be evaluated
S' model signal, analogue signal
VV variance value

The invention claimed is:

1. A method performed by a signal processing device for deriving noise statistical properties (NSP) for a signal (S), comprising:
    (a) providing a distorted signal (DS) originating from an underlying signal (S) to be evaluated;
    (b) deriving distorted noise statistical properties (DNSP) from said distorted signal (DS);
    (c) subjecting, using the signal processing device, said distorted noise statistical properties (DNSP) to a deconvolution/inversion process with respect to a respective noise model (NM) for said underlying signal (S) to be evaluated; and
    (d) deriving undistorted noise statistical properties as said noise statistical properties (NSP) for said underlying undistorted signal (S),
    wherein said step of subjecting (c) said distorted noise statistical properties to a deconvolution/inversion process is performed at least in part iteratively and said step of subjecting (c) includes
    (c1) deriving or measuring at least one of the group consisting of a mean value and a variance value from said distorted signal as a distorted mean value and as a distorted variance value, respectively,
    (c2) initially setting and using measured mean value and measured variance value from step (c1) as starting iteration values and as intermediate iteration values,
    (c3) evaluating one of a) said variance by numerical inversion for a next iteration step based on said intermediate iteration values for said mean, and b) said mean by numerical inversion for a next iteration step based on said intermediate iteration values for said variance, and in response to evaluating said variance, taking said mean as a new respective intermediate iteration value for said variance and, in response to evaluating said mean, taking said variance as a new respective intermediate iteration value for said mean,
    (c4) evaluating one of a) said variance by numerical inversion for a next iteration step based on said intermediate iteration values for said mean, and b) said mean by numerical inversion for a next iteration step based on said intermediate iteration values for said variance, which was not evaluated in step (c3), and in response to evaluating said variance in step (c4), taking said mean as a new respective intermediate iteration value for said variance and, in response to evaluating said mean in step (c4), taking said variance as a new respective intermediate iteration value for said mean,
    (c5) repeating at least one of said steps (c3) and (c4) for the next iteration step until given stopping criteria are fulfilled, and
    (c6) taking as noise statistical data (NSD), or as a part or a pre-form thereof, recently evaluated and calculated iteration values for said variance and for said mean, after stopping the iteration.

2. The method according to claim 1,
    wherein said deconvolution inversion process is designed for removing an effect of distortion in particular with respect to said distorted noise statistical properties (DNSP).

3. The method according to claim 1,
    wherein a distortion is defined by as at least one of the group consisting of a distortion function and a distortion distribution.

4. The method according to claim 3,
    wherein said distortion function has a unique inverse distortion function.

5. The method according to claim 1,
    wherein a distortion is defined by at least one of the group consisting of clipping and filtering.

6. The method according to claim 1,
    wherein at least one of the group consisting of said distorted noise statistical properties (DNSP), said undistorted noise statistical properties, said noise statistical properties (NSP) and a part thereof is given as respective distorted noise statistical data (DNSD), undistorted noise statistical data and noise statistical data (NSD), respectively.

7. The method according to claim 6,
    wherein at least one of undistorted noise statistical data (DNSD), and noise statistical data (NSD) comprise at least one of the group consisting of statistical mean and statistical variance.

8. The method according to claim 1,
    wherein said noise model (NM) is defined by at least one of the group consisting of noise model function and noise model distribution.

9. The method according to claim 8,
    wherein said noise model function have a corresponding unique inverse noise model function.

10. The method according to claim 9,
    wherein said noise model function is a Gaussian type function.

11. The method according to claim 1,
    wherein said deconvolution/inversion is at least in part performed analytically.

12. The method according to claim 1,
    wherein said deconvolution/inversion is at least in part performed numerically.

13. The method according to claim 1,
    wherein said stopping criteria are referred to as being fulfilled if the differences of the values for the variance and for the mean of directly succeeding iterations or iteration steps are below given respective threshold values.

14. The method according to claim 1,
    wherein a look-up table (LUT) is formed representing a one-to-one relationship between distorted noise statistical data (DNSP, DNSD) and respective non-distorted noise statistical data (NSP, NSD).

15. An apparatus for deriving noise statistical properties (NSP) for a signal (S), comprising:
- means for providing a distorted signal (DS) originating from an underlying signal (S) to be evaluated;
- means for deriving distorted noise statistical properties (DNSP) from said distorted signal (DS);
- means for subjecting said distorted noise statistical properties (DNSP) to a deconvolution/inversion process with respect to a respective noise model (NM) for said underlying signal (S) to be evaluated; and
- means for deriving undistorted noise statistical properties as said noise statistical properties (NSP) for said underlying undistorted signal (S),
- wherein said means for subjecting said distorted noise statistical properties to a deconvolution/inversion process is performed at least in part iteratively and includes
- means for deriving or measuring at least one of the group consisting of a mean value and a variance value from said distorted signal as a distorted mean value and as a distorted variance value, respectively,
- means for setting and using measured mean value and measured variance value as starting iteration values and as intermediate iteration values,
- means for evaluating said variance by numerical inversion for a next iteration step based on said intermediate iteration values for said mean,
- means for evaluating said mean by numerical inversion for a next iteration step and based on said intermediate iteration values for said variance,
- means for taking said mean as a new respective intermediate iteration value for said variance,
- means for taking said variance as a new respective intermediate iteration value for said mean,
- means for repeating the iteration using said means for evaluating said variance, means for taking said variance, means for evaluating said mean, and means for taking said mean, until given stopping criteria are fulfilled, and
- means for taking as noise statistical data (NSD), or as a part or a pre-form thereof, recently evaluated and calculated iteration values for said variance and for said mean, after stopping the iteration.

16. A non-transitory computer readable storage medium having stored thereon a computer program product that when executed by the computer causes the computer to execute the method comprising:
- (a) providing a distorted signal (DS) originating from an underlying signal (S) to be evaluated;
- (b) deriving distorted noise statistical properties (DNSP) from said distorted signal (DS);
- (c) subjecting, using the signal processing device, said distorted noise statistical properties (DNSP) to a deconvolution/inversion process with respect to a respective noise model (NM) for said underlying signal (S) to be evaluated; and
- (d) deriving undistorted noise statistical properties as said noise statistical properties (NSP) for said underlying undistorted signal (S),
- wherein said step of subjecting (c) said distorted noise statistical properties to a deconvolution/inversion process is performed at least in part iteratively and said step of subjecting (c) includes
- (c1) deriving or measuring at least one of the group consisting of a mean value and a variance value from said distorted signal as a distorted mean value and as a distorted variance value, respectively,
- (c2) initially setting and using measured mean value and measured variance value from step (c1) as starting iteration values and as intermediate iteration values,
- (c3) evaluating one of a) said variance by numerical inversion for a next iteration step based on said intermediate iteration values for said mean, and b) said mean by numerical inversion for a next iteration step based on said intermediate iteration values for said variance, and in response to evaluating said variance, taking said mean as a new respective intermediate iteration value for said variance and, in response to evaluating said mean, taking said variance as a new respective intermediate iteration value for said mean,
- (c4) evaluating one of a) said variance by numerical inversion for a next iteration step based on said intermediate iteration values for said mean, and b) said mean by numerical inversion for a next iteration step based on said intermediate iteration values for said variance, which was not evaluated in step (c3), and in response to evaluating said variance in step (c4), taking said mean as a new respective intermediate iteration value for said variance and, in response to evaluating said mean in step (c4), taking said variance as a new respective intermediate iteration value for said mean,
- (c5) repeating at least one of said steps (c3) and (c4) for the next iteration step until given stopping criteria are fulfilled, and
- (c6) taking as noise statistical data (NSD), or as a part or a pre-form thereof, recently evaluated and calculated iteration values for said variance and for said mean, after stopping the iteration.

* * * * *